(12) United States Patent
Boot et al.

(10) Patent No.: US 8,696,971 B2
(45) Date of Patent: *Apr. 15, 2014

(54) METHOD AND SYSTEM FOR LAYERWISE PRODUCTION OF A TANGIBLE OBJECT

(75) Inventors: Ronaldus Jacobus Johannes Boot, Son en Breugel (NL); Herman Hendrikus Maalderink, Nuenen (NL)

(73) Assignee: Nederlandse Organisatie Voor Toegepast-Natuurwetenschappelijk Onderzoek TNO, Delft (NL)

( * ) Notice: Subject to any disclaimer, the term of this patent is extended or adjusted under 35 U.S.C. 154(b) by 0 days.

This patent is subject to a terminal disclaimer.

(21) Appl. No.: 12/374,032

(22) PCT Filed: Jul. 18, 2007

(86) PCT No.: PCT/NL2007/050358
§ 371 (c)(1),
(2), (4) Date: Mar. 16, 2009

(87) PCT Pub. No.: WO2008/010715
PCT Pub. Date: Jan. 24, 2008

(65) Prior Publication Data
US 2009/0309267 A1  Dec. 17, 2009

(30) Foreign Application Priority Data
Jul. 18, 2006  (EP) ..................................... 06076434

(51) Int. Cl.
*B29C 35/04* (2006.01)

(52) U.S. Cl.
USPC ............................ 264/401; 264/308; 264/334

(58) Field of Classification Search
USPC .......................................... 264/308, 334, 401
See application file for complete search history.

(56) References Cited

U.S. PATENT DOCUMENTS

| 5,009,585 | A | * | 4/1991 | Hirano et al. | ............... 425/174.4 |
| 5,164,128 | A | * | 11/1992 | Modrek et al. | ................ 264/401 |
| 2010/0227068 | A1 | * | 9/2010 | Boot et al. | ..................... 427/346 |

FOREIGN PATENT DOCUMENTS

| DE | 19957370 A1 | * | 6/2001 | ............... B05D 1/18 |
| DE | 102 04 985 A1 | | 8/2003 | |
| DE | 102 56 672 A1 | | 6/2004 | |
| DE | 10256672 A1 | | 6/2004 | |
| EP | 467100 A1 | * | 1/1992 | ............. B29C 35/08 |

* cited by examiner

*Primary Examiner* — Amjad Abraham
*Assistant Examiner* — Ninh Le
(74) *Attorney, Agent, or Firm* — Pearne & Gordon LLP (57) ABSTRACT

A method cycle of a method for layerwise production of a tangible object (5) comprises the successive steps of: solidifying predetermined parts of a liquid so as to obtain a solid layer (14) having a predetermined shape; separating said solid layer from a construction shape (6); and moving, relative to one another, the separated solid layer and the construction shape to a predetermined position relative to one another. Solidifying is carried out such that the solid layer and the construction shape have nonmatching shapes in the sense that all surface portions of a solid layer side (70) that are or have been in contact with a liquid contacting side (11) of the construction shape can not simultaneously be brought in full contacting engagement with the liquid contacting side.

2 Claims, 4 Drawing Sheets

METHOD AND SYSTEM FOR LAYERWISE PRODUCTION OF A TANGIBLE OBJECT

FIELD AND BACKGROUND OF THE INVENTION

The invention relates to a method for layerwise production of a tangible object according to the preamble of claim 1. The invention also relates to a system for layerwise production of a tangible object.

Such a method is known. For example it is known from DE10256672A1 that the liquid reservoir has a transparent bottom plate whose upper side has a separation layer. In the space above the bottom plate there is a carrier plate which can be moved up and down. During its movement, the carrier plate can reach positions ranging from under the liquid level to above it. A firstly formed solid layer of the tangible object is adhered to the underside of the carrier plate. Consecutively formed solid layers are each adhered to a previously formed solid layer, respectively.

Each time after solidification of a new layer, the carrier plate together with the earlier solidified layers adhered thereon are moved upwards in order to separate the last formed solid layer from the separation layer of the bottom plate. Each time after such separation, the separated solid layer is moved to a predetermined position at a distance from the separation layer of the bottom plate for letting the liquid flow-in between the separated solid layer and the separation layer of the bottom plate. By solidifying a predetermined area of a layer containing the flown-in liquid, a successive solid layer of the tangible object is obtained.

The upward separation movement of the carrier plate requires an external force to be exerted on the carrier plate. This external force results in an increase of internal stresses in the tangible object being produced. Especially vertical tensile stresses in objects with varying cross-sections can become locally very high. If these stresses become too high, the object can deform, deteriorate or break. Since, for the known method, a fast separation requires the external force to be high, the internal stresses in the tangible object during such fast separation are high as well. Thus, a drawback of the known method is, that there are only limited kinds of objects that can be rapidly formed. Other kinds of objects, especially those with strongly varying cross-sections, can not be rapidly formed with the known method.

SUMMARY OF THE INVENTION

It is an object of the invention to enable a faster production of a tangible object.

Therefore, according to a first aspect of the invention, a method according to claim 1 is provided.

In this method according to the first aspect of the invention, during at least one of said method cycles said solidifying is carried out such that the solid layer and the construction shape have nonmatching shapes in the sense that all said surface portions of said solid layer side can not simultaneously be brought in full contacting engagement with the liquid contacting side of the construction shape. Favorable effects of the application of such nonmatching shapes are elucidated as follows.

During fast separation of the last formed solid layer from the construction shape, there is a period of time in which the liquid (resin) is not in equilibrium with the forces/pressures in the interspace between the solid layer and the construction shape. Then, a reduced pressure (of the vacuum or gaseous liquid) is created in said interspace, resulting in a force to let the liquid flow in the expanding interspace. Hence, then there exists a pressure difference between the (low) pressure in said interspace and the (high) pressure exerted on the layers of the object under production that were solidified previously to the last formed solid layer (note that, for the known method, the pressure in a space above and adjoining the liquid level is the usual environmental pressure, i.e. the atmospheric pressure). The presence of said pressure difference is responsible for a great deal of required external force action necessary for separating the solid layer from the construction shape, especially for objects with (strongly) varying cross-sections. The exertion of this great deal of external force action, on its turn, is responsible for an increase of internal stresses in the object during said separation.

By the application of such nonmatching shapes, the liquid will fill up the expanding interspace between the solid layer and the construction shape much faster. That is, the impossibility of the mentioned simultaneous full contacting engagement makes that, at the start of the separating step, the interspace has already partly been filled up by the liquid. Hence, by the application of such nonmatching shapes, said pressure difference is decreased. Therefore, that part of the required external force action which is necessary for overcoming said pressure difference is decreased, as a result of which that part of the required external force action contributes to a lesser extent to said increase of internal stresses in the object. This allows that, given a maximum permissible internal stress level, a greater share of the external force is available for overcoming other types of resistances occurring during separation. In other words, the application of the nonmatching shapes results in a smaller share of external force wasted for overcoming said pressure difference and hence in a larger share of external force available for the benefit of achieving acceleration of the separation. Hence, the separation steps in the method of producing the tangible object can be accelerated, even (and in fact especially) for objects with strongly varying cross-sections.

During separation, also the adhesion forces between the last formed solid layer and the construction shape need to be overcome. (Note, that this adhesion is normally reduced as much as possible by using an anti-stick layer or coating on the construction shape.) The adhesion forces are proportional to the contact area between the solid layer and the construction shape. Since by application of the nonmatching shapes this contact area is reduced, the adhesion forces are reduced as well. This further accelerates the separation steps.

In addition, the application of the nonmatching shapes has another favorable effect, which is elucidated as follows. According to the method, the separation step is followed by a positioning step in which, the separated solid layer and the construction shape are moved, relative to one another, to a predetermined position relative to one another. Normally, there occurs directly after completion of the separation a so-called "overshoot" in this relative movement. That is, in an initial stage of the positioning step, the separated solid layer and the construction shape are moved further apart than desired. This overshoot has to be compensated by moving, during a later stage of the lo positioning step, the separated solid layer and the construction shape closer together again. During this compensatory movement, surplus of liquid which has meanwhile entered the interspace between the separated solid layer and the construction shape, has to be forced out of this interspace again. This forcing out is time consuming, especially when the construction shape is flexible.

By the application of the nonmatching shapes, at least the following further advantage is obtained. The achieved reductions in pressure difference, as well as in adhesion forces, that have to be overcome during the initial stage of the separating step, result in a diminished extent of the overshoot. This occurrence of less overshoot accelerates the positioning step, since there is less overshoot to be compensated in the positioning step.

Hence, not only the separation steps, but also the positioning steps in the method of producing the tangible object can be accelerated.

Furthermore, according to a second aspect of the invention, a system is provided.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings.

DETAILED DESCRIPTION

Figure 1:
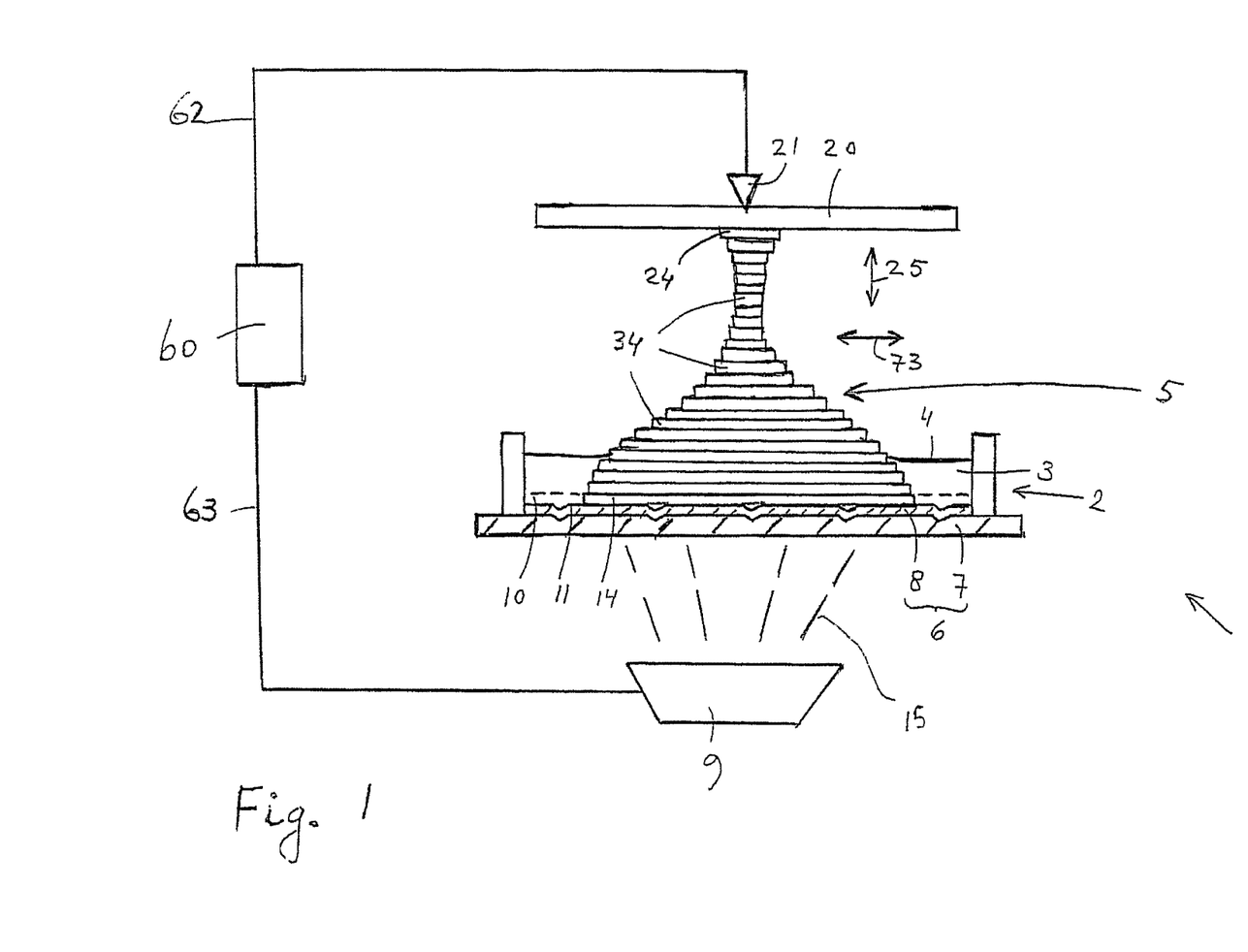
FIG. 1 schematically shows a sectional side view of an example of an embodiment of a system according to the invention.
Figure 2:
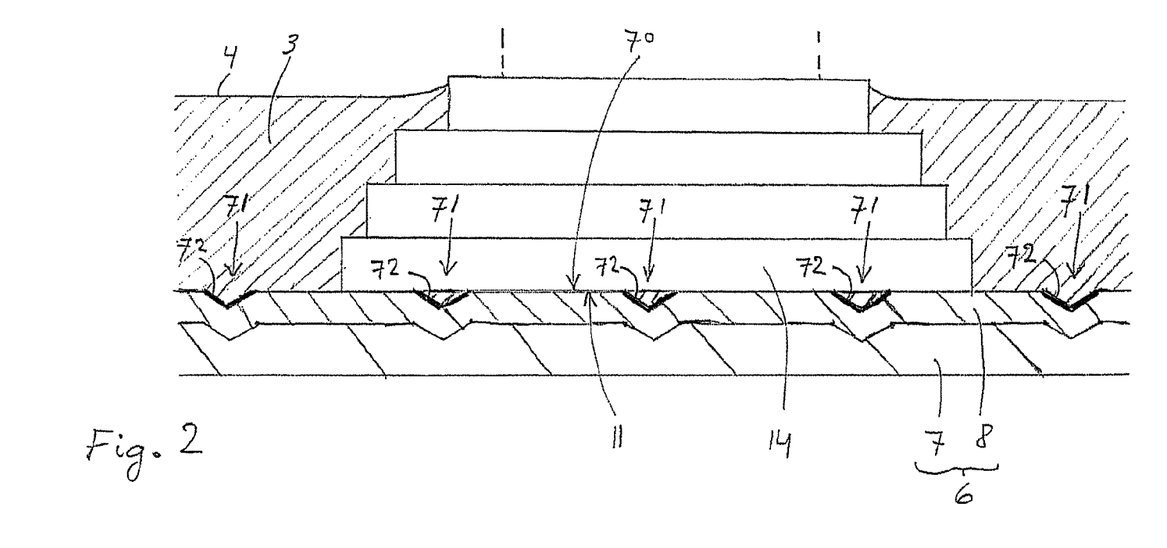
FIG. 2 schematically shows a fragmentary view of the system of FIG. 1 during a stage of a method according to the invention.

Reference is first made to FIGS. 1 and 2 which show an example of a system 1 for layerwise production of a tangible object 5. The system 1 can perform an example of a method for layerwise production of a tangible object. The tangible object 5 is shown while being produced. It may for example be a prototype or model of an article of manufacture or other suitable type of object.

The system 1 comprises a liquid reservoir 2 which, in the shown example, is filled with a liquid 3 up to a liquid level 4. The system 1 further comprises a construction shape 6 which is positioned below the liquid level 4 in the liquid reservoir 2. In the shown example the construction shape 6 comprises a bottom platform 7 of the reservoir 2, as well as, on top of the platform 7, an anti-stick coating 8. The construction shape 6 has a liquid contacting side 11 that is in contact with the liquid 3 in the liquid reservoir. Many other types and shapes of construction shapes can be applied instead.

The system 1 further comprises solidifying means 9 for solidifying predetermined parts of the liquid 3, the solidifying taking place at least when said parts are in contact with the liquid contacting side 11 of the construction shape 6, so as to obtain a solid layer 14 of the tangible object 5, the solid layer thus having a predetermined shape. In the shown example, a predetermined area of a liquid layer 10, adjoining the liquid contacting side 11, is solidified.

The solid layer 14 has a solid layer side 70 (cf. FIG. 2) comprising all of surface portions of the solid layer 14 that are or have been in said contact with the liquid contacting side 11 of the construction shape 6. In the shown condition of the example of FIGS. 1 and 2, said contact is actually present between the solid layer side 70 and the liquid contacting side 11 over the most parts of the shown solid layer side 70. For those parts of the solid layer side 70 for which said contact is not actually present, said contact was present in an earlier stage of the method, as will be clarified later.

Figure 3:
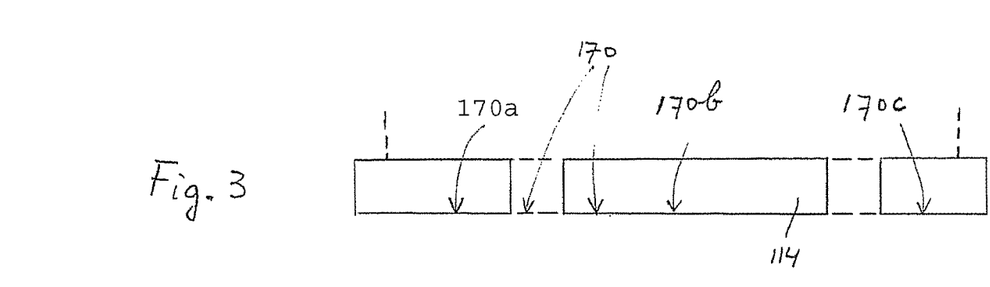
FIG. 3 schematically shows an example of a solid layer of an object obtainable by a method according to the invention.

It is remarked that in the example shown in FIGS. 1 and 2, all surface portions of the solid layer 14 that are or have been in said contact with the liquid contacting side 11 of the construction shape 6 together form a continuous solid layer side 70. However, since the solidifying means 9 are able to solidify in various ways different predetermined parts of the liquid 3, various types of solid layers are possible, for example solid layers containing gaps. An example of a solid layer as last meant is shown in FIG. 3. There it is seen that the solid layer side 170 of the solid layer 114 comprises surface portions 170a, 170b and 170c of the solid layer 114 that are or have been in said contact with a liquid contacting side of a construction shape. In this example the surface portions 170a, 170b and 170c together form a discontinuous solid layer side 170.

The solidifying means 9 can use any suitable chemical or physical process to solidify the predetermined parts of the liquid. The solidifying means 9 may for example initiate a chemical reaction of a component in the liquid which results in a solid reaction product. For example, the liquid 3 may be a liquid resin which can be cured by electromagnetic radiation, for example a photo-polymer of which polymerisation can be activated by projecting light of a suitable wavelength. The liquid can be transformed into a solid by a suitable type of energy and the solidifying means 9 may include a source of energy which can selectively provide the energy to the predetermined area. The source of energy may for example include a source of electromagnetic radiation. The solidifying means 9 may include a light source which can emit light 15 which is projected onto the predetermined area of the liquid layer 10 via a projection unit of the solidifying means 9 in a pattern corresponding to the desired shape and size of the solid layer 14. To enable the light or other radiation 15 to enter the liquid reservoir 2, the construction shape 6 may include a window which is transparent to the radiation 15.

The system 1 further comprises separating means for separating said solid layer 14 from said construction shape 6. In the shown example, the separating means comprises a carrier plate 20 located above the construction shape 6. As indicated by double-arrow 25 in FIG. 1, the carrier plate 20 is movable up and down relative to the construction shape 6 by the action of a carrier plate actuator 21. During its movement, the carrier plate 20 can reach positions ranging from under the liquid level 4 to above it. A firstly formed solid layer 24 of the tangible object 5 is adhered to the underside of the carrier plate 20. Consecutively formed solid layers 34 are each adhered to a previously formed solid layer, respectively. Each time after solidification of a new layer, the carrier plate together with the solidified layers adhered thereon are moved upwards, as a result of which the last formed solid layed each time is being separated from the construction shape 6.

Each time after such separation, the separated solid layer 14 is furthermore moved to a predetermined position at a distance from the construction shape 6 for letting the liquid flow-in between the separated solid layer 14 and the construction shape 6. Then, by similar solidifying of a predetermined area of a similar liquid layer containing the flown-in liquid, a successive solid layer of the tangible object 5 is obtained. The moving means for this positioning movement comprises the carrier plate 20 movable by the carrier plate actuator 21.

It will be evident that the method for layerwise production of a tangible object is a cyclic method, wherein the described chronological steps of solidifying, separating and positioning together are comprised in a single cycle of the method.

In the example shown in FIG. 1, the system 1 further comprises a controller 60. In the shown example, the controller 60 is communicatively connected, via a connection 62, to the carrier plate actuator 21 for controlling the operation of the carrier plate actuator 21. Furthermore, the controller 60 is communicatively connected, via a connection 63, to the solidifying means 9 for controlling the operation of the solidifying means 9.

The controller 60 may be implemented in any suitable manner. By means of the controller 60, the controlling of the operations of the carrier plate actuator 21 and of the solidifying means 9 can be geared to one another for controlling the production of objects.

The construction shape 6 and the solid layer 14, obtained during such method cycle, have nonmatching shapes in the sense that all said surface portions of said solid layer side 70 can not simultaneously be brought in full contacting engagement with the liquid contacting side 11 of the construction shape 6.

In the example shown in FIGS. 1 and 2, said nonmatching shapes are realized in the following way. The construction shape 6 comprises a number of recesses 71 (cf. FIG. 2) formed by the shape of its liquid contacting side 70. Such recesses may for example be straight or curved channels. Also, only one recess may be applied, for example one in the form of a channel which, in a view from above onto the construction shape 6, has a spiral shape. During the solidifying step of a method cycle, portions of the liquid 3 contained in the recesses 71 are prevented from being solidified. Hence, in this case, the solid layer side 70 has no protruding portions fitting in the recesses 71. Therefore the solid layer side 70 can not be brought in full contacting engagement with the liquid contacting side 11 of the construction shape 6. This means that the obtained solid layer 14 has, in the abovementioned sense, a nonmatching shape with the construction shape 6.

Consequently, at the start of a separating step, the recesses 71 are filled with the liquid 3. Thanks to these filled recesses, the liquid will, during separating, quickly fill up the expanding interspace between the solid layer 14 and the construction shape 6. This holds even more when the recesses 71 are in fluid connection with the bulk of the liquid 3 in the liquid reservoir 2, since lo then there will be quick supply of liquid to the expanding interspace via the recesses 71.

Such application of such recesses as explained above, provides the advantage that it can be realized easily for various types of construction shapes.

In the shown example, during the solidifying step of at least one of said method cycles, the solidifying is realized by means of emitting radiation 15 onto the predetermined parts of the liquid 3. The construction shape comprises radiation blocking means for partly blocking the emitted radiation. The radiation blocking means are arranged for preventing that the radiation 15 reaches the portions of the liquid contained in the recesses 71 for preventing these portions from being solidified. In the example, the radiation blocking means comprises radiation masks 72 applied in the boundaries of the recesses 71, thus masking the liquid content of the recesses 71 against being radiated. However, other ways of blocking radiation can be applied, for example blocking radiation further upstream of the radiation source, such as by means of a projection unit of the solidifying means. Such solutions of blocking radiation can be realized easily for various types of construction shapes.

Anytime during the performing of the method, there can be performed a relative movement between the construction shape 6 and the object 5 under construction, the relative movement being in a direction having at least a component tangent to an area of the liquid contacting side 11 of the construction shape 6.

For example, it is possible that, during the solidifying step of at least one of said method cycles, the construction shape 6 is moved, relative to the object 5 under construction, in a direction having at least a component tangent to a contact area of the liquid contacting side 11, the contact area being in contact with one of the predetermined parts of the liquid 3 under solidification. In the example of FIGS. 1 and 2 this is realized by moving the construction shape, relative to the object 5, horizontally as indicated by double arrow 73 in FIG. 1. Such relative movement can for example be carried out by moving the carrier plate 20 by the action of the carrier plate actuator 21. However, such relative movement can more generally also be carried out by moving the construction shape 6 by the action of a suitable construction shape actuator.

In this way, also those parts of the liquid layer 10 which would otherwise not be reachable by the radiation 15 because of the presence of the masks 72, can be radiated. The relative movement can for example be an oscillating movement. However, other types of such relative movement can also be applied. For example it is possible to provide the construction shape 6 as a rotatable table having a spiral shaped recess structure as mentioned earlier.

Also it is possible that a solidification step of the method comprises one or more successive solidification stages, wherein those parts of the liquid layer which were not solidified in such solidification stage (because of not having been reached by the radiation due to the masks) are solidified in a successive such solidification stage. The said relative movement in a direction having the said tangent component can then for example be performed inbetween the different solidification stages. Optionally, the said relative movement inbetween the different solidification stages may include a temporary (separation) movement in a direction transverse to an area of the liquid contacting side 11 of the construction shape 6.

Furthermore, it is remarked that it is also possible that those parts of the liquid layer which were not solidified during the solidification step of a method cycle (because of not having been reached by the radiation due to the masks) can be solidified in the solidification step of a successive method cycle, i.e. together with the solidification of a successive liquid layer. This can also improve the mechanic interconnection between the layers of the tangible object.

Similar relative movements can also be applied during a separating step of the method. That is, during the separating step of at least one of said method cycles, the construction shape 6 is moved, relative to the object 5 under construction, in a direction having at least a component tangent to a contact area between the liquid contacting side 11 of the construction shape 6 and the solid layer side 70 of the solid layer 14. This stimulates that the liquid will, during separating, quickly fill up the expanding interspace between the solid layer 14 and the construction shape 6. This has a favorable influence on the speed of performing the separation steps. It is remarked that the last mentioned relative movement of the construction shape during a separation step of the method, is favorable not only when applied in combination with the described "nonmatching shapes" features, but also when applied without such "nonmatching shapes" features.

Furthermore, it is favorable to inject, at least during a part of the separating step and/or a part of the positioning step of a method cycles, a fluid such as the liquid 3 between the liquid contacting side 11 of the construction shape 6 and the solid layer side 70 of the solid layer 14. The expanding interspace between the solid layer 14 and the construction shape 6 will for example be filled up more quickly if injection is performed with the liquid 3. Preferably, the liquid 3 is injected in the recesses 71, since this results in a very effective supply of the liquid to the expanding interspace.

Figure 4A:
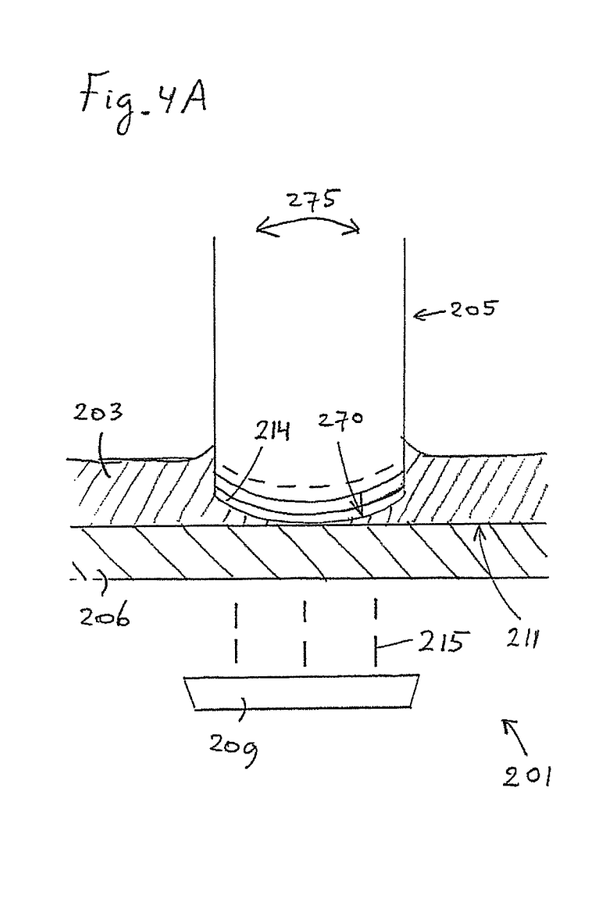
FIGS. 4A and 4B schematically show a fragmentary sectional side view of an example of another embodiment of a system according to the invention.
Figure 4B:
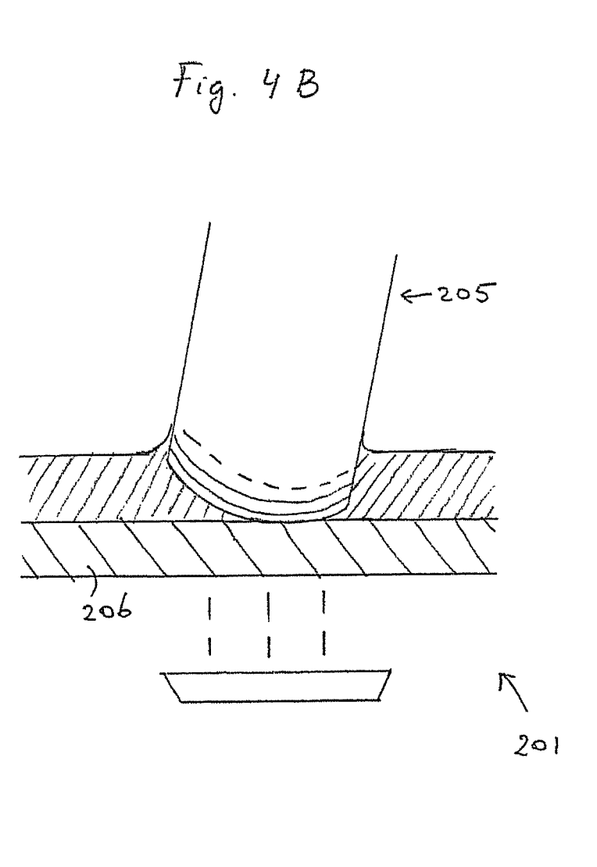

Reference is now made to FIGS. 4A and 4B. These figures show a fragment of a system 201 for layerwise production of a tangible object 205. The system 201 comprises, similar to the example of FIGS. 1 and 2: a construction shape 206 having a liquid contacting side 211 for being in contact with liquid 203 in a liquid reservoir of the system 201, as well as solidifying means 209 for emitting radiation 215. Reference numeral 214 denotes, similar to the example of FIGS. 1 and 2, the last formed solid layer of the object 205, wherein the solid layer side 270 comprises all of surface portions of the solid layer 214 that are or have been in contact with the liquid contacting side 211 of the construction shape 206. The construction shape 206 and the solid layer 214 have nonmatching shapes in the sense that all said surface portions of said solid lo layer side 270 can not simultaneously be brought in full contacting engagement with the liquid contacting side 211 of the construction shape 206. In the embodiment shown in FIGS. 4A and 4B said nonmatching shapes are realized in that the solid layer side 214 has a non-flat shape.

The solidification that the solid layer 214 has undergone, has been carried out by moving the object 205 relative to the construction shape 206 in a kind of rotative manner indicated by double arrow 275. To further illustrate this, FIG. 4B shows a condition during said rotative movement, in which condition the object 205 has an orientation relative to the construction shape 206, which orientation differs from that of FIG. 4A. In the course of time during such rotation, different parts of the liquid 203 between the solid layer side 270 and the contacting side 211 are being solidified by exposing these parts to the radiation 215. In this way the solid layer 214 has been formed in the course of time.

Again, also for this embodiment, the application of the said nonmatching shapes results in improved separation, since the liquid 203 will fill up the expanding interspace between the solid layer 214 and the construction shape 206 much faster. In fact, this is another example of bringing the bulk of the liquid 203 in the liquid reservoir closer to the expanding interspace.

Figure 5A:
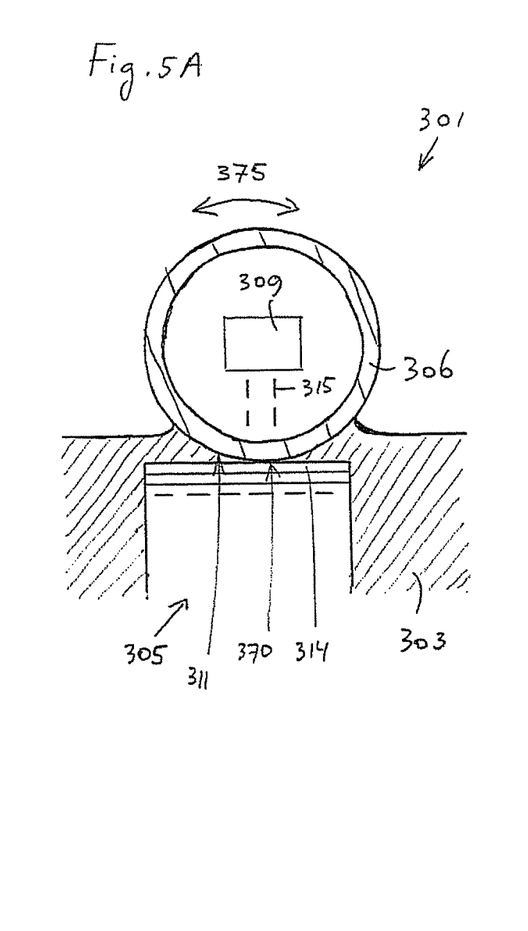
FIGS. 5A and 5B schematically show a fragmentary sectional side view of an example of yet another embodiment of a system according to the invention.
Figure 5B:
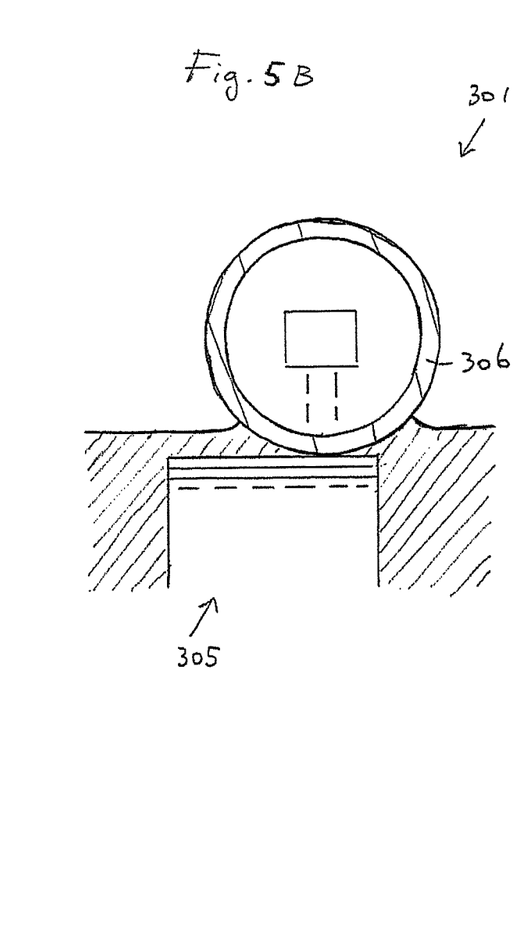

Reference is now made to FIGS. 5A and 5B. These figures show a fragment of a system 301 for layerwise production of a tangible object 305. The system 301 comprises, similar to the previous examples: a construction shape 306 having a liquid contacting side 311 for being in contact with liquid 303 in a liquid reservoir of the system 301, as well as solidifying means 309 for emitting radiation 315. Reference numeral 314 denotes, similar to the previous examples, the last formed solid layer of the object 305, wherein the solid layer side 370 comprises all of surface portions of the solid layer 314 that are or have been in contact with the liquid contacting side 311 of the construction shape 306. The construction shape 306 and the solid layer 314 have nonmatching shapes in the sense that all said surface portions of said solid layer side 370 can not simultaneously be brought in full contacting engagement with the liquid contacting side 311 of the construction shape 306. In the embodiment shown in FIGS. 5A and 5B said nonmatching shapes are realized in that the liquid contacting side 311 has a non-flat shape in regions other than any possible regions that form one or more recesses of the provided construction shape 306. (Note, that recesses such as the ones applied in the example of FIGS. 1 and 2 can optionally be incorporated both in the construction shape 306 of this embodiment and in the construction shape 206 of the embodiment of FIGS. 4A and 4B).

The solidification that the solid layer 314 has undergone, has been carried out by moving the construction shape 306 relative to the object 305 in a kind of rotative manner indicated by double arrow 375. To further illustrate this, FIG. 5B shows a condition during said rotative movement, in which condition the object 305 has an orientation relative to the construction shape 306, which orientation differs from that of FIG. 5A. In the course of time during such rotation, different parts of the liquid 303 between the solid layer side 370 and the contacting side 311 are being solidified by exposing these parts to the radiation 315. In this way the solid layer 314 has been formed in the course of time.

Again, also for this embodiment, the application of the said nonmatching shapes results in improved separation, since the liquid 303 will fill up the expanding interspace between the solid layer 314 and the construction shape 306 much faster. In fact, this is another example of bringing the bulk of the liquid 303 in the liquid reservoir closer to the expanding interspace.

In the foregoing specification, the invention has been described with reference to specific examples of embodiments of the invention. It will, however, be evident that various modifications and changes may be made therein without departing from the broader spirit and scope of the invention as set forth in the appended claims. For example, the liquid reservoir may be higher or lower than shown in FIG. 1. Furthermore, the object may have any suitable size and shape.

Also, the method and system can be arranged such that an upper layer, instead of a lower layer, of an object under production is solidified during each method cycle. Then, a carrier plate can be situated under the object under production, in stead of above it, while for example a light source of the solidifying means can be situated above the object under production, in stead of under it. In fact, this invention is applicable to a layerwise production method or system that operates in any orientation with respect to gravity.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device. For example, the controller 60 may include a separate apparatus which controls the operation of the carrier plate actuator 21, and another apparatus which controls the operation of the solidifying means 9.

Also, devices functionally forming separate devices may be integrated in a single physical device. For example, the controller 60 may be implemented as a single integrated circuit.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to advantage.

The invention claimed is:

1. A method for layerwise production of a tangible object (5; 205; 305), the method comprising:
   providing a liquid reservoir (2) containing a liquid (3; 203; 303);
   providing a construction shape (6; 206; 306) having a liquid contacting side (11; 211; 311) for being in contact with the liquid in the liquid reservoir;
   performing a method cycle comprising the successive steps of:
   solidifying predetermined parts of the liquid, the solidifying taking place at least when said parts are in contact with the liquid contacting side of the construction shape, so as to obtain a solid layer (14; 114; 214; 314) of the tangible object, the solid layer thus having a predetermined shape, and the solid layer having a solid layer side (70; 170; 270; 370) comprising all of surface portions of the solid layer that are in said contact with the liquid contacting side (11) of the construction shape during at least a part of said method cycle;
   separating said solid layer from said construction shape; and
   moving, relative to one another, the separated solid layer and the construction shape to a predetermined position relative to one another; and
   repeatedly performing said method cycle so as to similarly obtain, by similar solidifying predetermined parts of the liquid, a successive such solid layer adhered to the solid layer and adjoining said solid layer side of the solid layer;
   characterized in that
   during at least one of said method cycles said solidifying is carried out such that, as a result of said solidifying, the solid layer (14; 114; 214; 314) and the construction shape (6; 206; 306) have nonmatching shapes in the sense that all said surface portions of said solid layer side (70; 170; 270; 370) can not simultaneously be brought in full contacting engagement with the liquid contacting side (11; 211; 311) of the construction shape (6; 206; 306), the method further comprising wherein said nonmatching shapes are realized in that the solid layer side has a non-flat shape.

2. A method for layerwise production of a tangible object (5; 205; 305), the method comprising:
   providing a liquid reservoir (2) containing a liquid (3; 203; 303);
   providing a construction shape (6; 206; 306) having a liquid contacting side (11; 211; 311) for being in contact with the liquid in the liquid reservoir;
   performing a method cycle comprising the successive steps of:
   solidifying predetermined parts of the liquid, the solidifying taking place at least when said parts are in contact with the liquid contacting side of the construction shape, so as to obtain a solid layer (14; 114; 214; 314) of the tangible object, the solid layer thus having a predetermined shape, and the solid layer having a solid layer side (70; 170; 270; 370) comprising all of surface portions of the solid layer that are in said contact with the liquid contacting side (11) of the construction shape during at least a part of said method cycle;
   separating said solid layer from said construction shape; and
   moving, relative to one another, the separated solid layer and the construction shape to a predetermined position relative to one another; and
   repeatedly performing said method cycle so as to similarly obtain, by similar solidifying predetermined parts of the liquid, a successive such solid layer adhered to the solid layer and adjoining said solid layer side of the solid layer;
   characterized in that
   during at least one of said method cycles said solidifying is carried out such that, as a result of said solidifying, the solid layer (14; 114; 214; 314) and the construction shape (6; 206; 306) have nonmatching shapes in the sense that all said surface portions of said solid layer side (70; 170; 270; 370) can not simultaneously be brought in full contacting engagement with the liquid contacting side (11; 211; 311) of the construction shape (6; 206; 306), wherein said nonmatching shapes are realized in that the solid layer side (270) has a non-flat shape, and wherein during the solidifying step of at least one of said method cycles, a relative rotative movement is performed between the construction shape (206; 306) and the object (205; 305) under construction.

* * * * *

UNITED STATES PATENT AND TRADEMARK OFFICE
CERTIFICATE OF CORRECTION

PATENT NO. : 8,696,971 B2  Page 1 of 1
APPLICATION NO. : 12/374032
DATED : April 15, 2014
INVENTOR(S) : Boot et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 174 days.

Signed and Sealed this

Twenty-ninth Day of September, 2015

Michelle K. Lee
*Director of the United States Patent and Trademark Office*